US011535379B1

(12) United States Patent
Rajan et al.

(10) Patent No.: US 11,535,379 B1
(45) Date of Patent: Dec. 27, 2022

(54) SYSTEM AND METHOD TO CONTROL THE UNCOMMANDED MOVEMENT OF SERVICE CARTS IN AIRCRAFT CABINS

(71) Applicant: Goodrich Corporation, Charlotte, NC (US)

(72) Inventors: Ganeshraj Rajan, Tamil Nadu (IN); Divakararao Vadada, Bangalore (IN)

(73) Assignee: Goodrich Corporation, Charlotte, ND (US)

( * ) Notice: Subject to any disclaimer, the term of this patent is extended or adjusted under 35 U.S.C. 154(b) by 399 days.

(21) Appl. No.: 16/790,187

(22) Filed: Feb. 13, 2020

(51) Int. Cl.
*A47B 31/06* (2006.01)
*B64D 11/00* (2006.01)
*B60B 33/00* (2006.01)
*A47B 31/00* (2006.01)

(52) U.S. Cl.
CPC .......... *B64D 11/0007* (2013.01); *A47B 31/06* (2013.01); *B60B 33/0094* (2013.01); *A47B 2031/002* (2013.01)

(58) Field of Classification Search
CPC .............. A47B 2031/002; A47B 31/06; B60B 33/0094; B64D 11/0007
See application file for complete search history.

(56) References Cited

U.S. PATENT DOCUMENTS

| | | | |
|---|---|---|---|
| 3,179,208 A * | 4/1965 | Umanoff | B64D 11/0007 186/40 |
| 3,651,894 A | 3/1972 | Auriemma | |
| 3,710,895 A | 1/1973 | Freedman | |
| 3,951,426 A | 4/1976 | Shaffer et al. | |
| 7,708,120 B2 | 5/2010 | Einbinder | |
| 10,377,493 B2 | 8/2019 | Burd | |
| 2015/0028157 A1* | 1/2015 | Hoogeveen | B64D 11/04 244/118.1 |
| 2018/0185208 A1* | 7/2018 | Jonsson | A61G 7/0528 |
| 2019/0023265 A1 | 1/2019 | Takeda et al. | |
| 2019/0084604 A1 | 3/2019 | Bauer et al. | |
| 2019/0291637 A1* | 9/2019 | Pozzi | G01S 13/74 |
| 2019/0314993 A1* | 10/2019 | Orr | B64D 11/0007 |

FOREIGN PATENT DOCUMENTS

| | | |
|---|---|---|
| CN | 109045722 A | 12/2018 |
| CN | 109436073 A | 3/2019 |
| DE | 3042599 A1 | 6/1982 |
| HK | 18106498 | 9/2018 |
| IN | 893KOLNP2010 | 8/2010 |

* cited by examiner

*Primary Examiner* — Matthew W Ing

(74) *Attorney, Agent, or Firm* — Suiter Swantz pc llo

(57) ABSTRACT

A system for monitoring the state of a service cart and applying corrective measures and warnings when potentially unsafe conditions exist includes sensors for monitoring the speed and inclination of the service cart. Speed and inclination data are displayed for the operator, along with any limit-based warning states. Under certain conditions, an actuator automatically activates a brake to immobilize the service cart. The system also includes a proximity sensor to identify obstacles in front of the service cart. The system defines limitations for obstacles in front of the service cart and activates the brake under certain conditions.

13 Claims, 5 Drawing Sheets

SYSTEM AND METHOD TO CONTROL THE UNCOMMANDED MOVEMENT OF SERVICE CARTS IN AIRCRAFT CABINS

BACKGROUND

Airline service carts (trolleys) are useful for transportation of beverages, airline meals, and other items inside the cabin. The service cart is a rigid box which can be moved via castor wheels fixed at each corner. To hold the service cart in position, brakes are applied manually by pressing a brake pedal installed at a bottom edge. When the service carts are not in use during flight, they are manually braked and latched to the cabin walls to avoid unintended motion inside the cabin. However, instances have occurred where uncommanded service carts have gotten loose and caused damage or injury, including injury to passengers and serious injury to flight attendants.

Service carts include a brake pedal and a release pedal. In order to arrest service cart movement, a crew member must manually apply the brake by pressing the brake pedal and latching the service cart to the cabin wall. A crew member must visually monitor the service cart for unintended movement, and the only remedial action is to quickly chase the service cart and apply the brake.

Furthermore, while operating the service cart, crew members must diligently look for obstacles in the servicing path or aisle. If overlooked (or if obstacles are unobservable due to the size of the service cart) the crew member may accidently hit the obstacles.

SUMMARY

In one aspect, embodiments of the inventive concepts disclosed herein are directed to a system for monitoring the state of a service cart and applying corrective measures and warnings when potentially unsafe conditions exist. The system monitors the speed and inclination of the service cart; speed and inclination data are displayed for the operator, along with any limit-based warning states. Under certain conditions, an actuator automatically activates a brake to immobilize the service cart.

In a further aspect, the system includes a proximity sensor to identify obstacles in front of the service cart. The system defines limitations for obstacles in front of the service cart and activates the brake under certain conditions.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
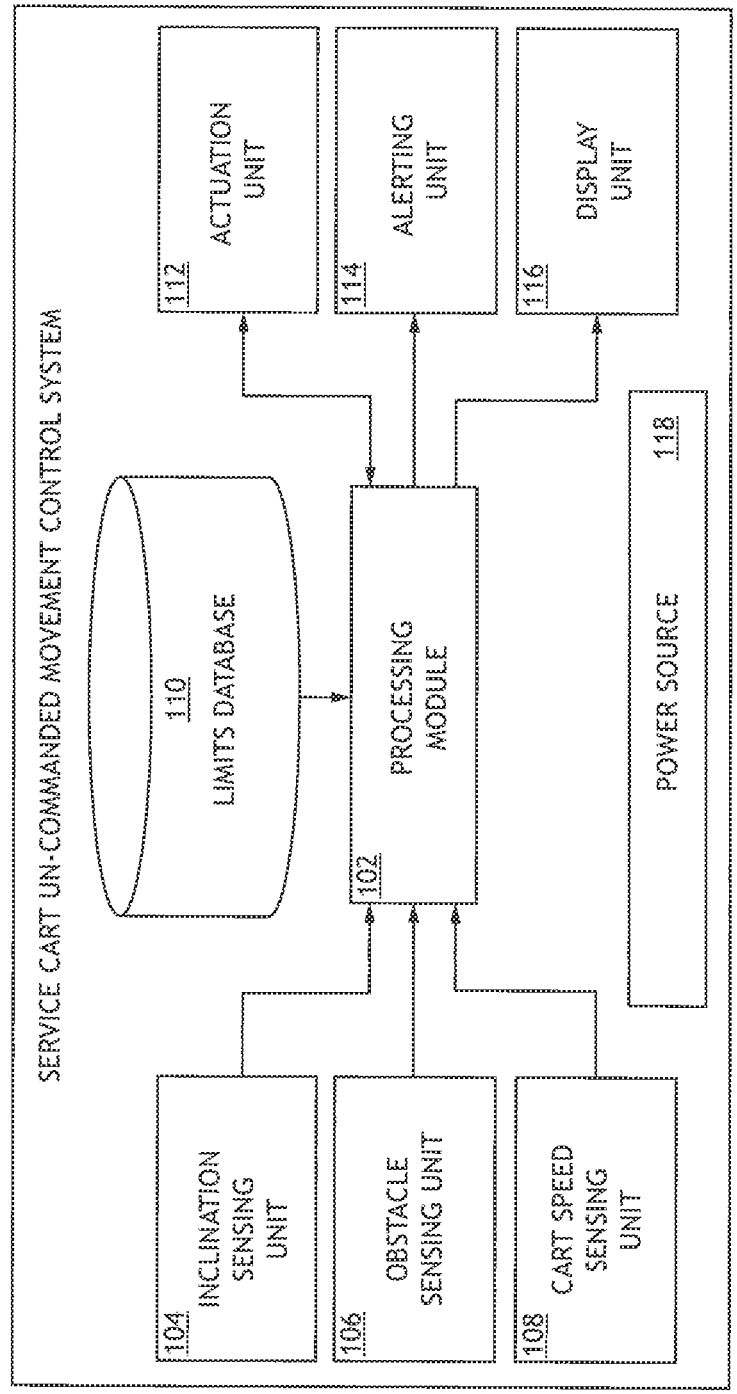
FIG. 1 shows a block diagram of a system for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for monitoring the state of a service cart and applying corrective measures and warnings when potentially unsafe conditions exist. The system monitors the speed and inclination of the service cart; speed and inclination data are displayed for the operator, along with any limit-based warning states. Under certain conditions, an actuator automatically activates a brake to immobilize the service cart.

Referring to FIG. 1, a block diagram of a system 100 for implementing an exemplary embodiment is shown. The system 100 includes a processor 102, and one or more sensors 104, 106, 108 connected to the processor 102. The sensors 104, 106, 108 may include an inclination sensor 104, a proximity (obstacle) sensor 106, and a speed sensor 108. Inclination sensors 104 may include inclinometers, tilt sensors, level meters, level gauges, etc. Speed sensors 108 may include Hall Effect sensors, Resolvers, etc. to measure the rotational speed of castor wheels.

The processor 102 may reference a database 110 of cart limits corresponding to potential sensor values. When one or more sensor values exceed a cart limit as defined in the database 110, the processor 102 may engage in one or more defined remedial actions; for example, the processor 102 may actuate a brake actuator 112 to stop the cart, display a warning message on a connected display device 116, play an audio warning via a speaker 114, transmit a message to a remote device, etc. The brake actuator 112 may comprise a hydraulic actuator, pneumatic Actuator, electric Actuator, etc., integrated with brake pedal and release pedal of the service cart. The movement of brake pedal is captured as the brake status. The system 100 may require an internal power source 118 such as a battery to drive the processor 102, sensors 104, 106, 108, actuator 112, and display 116 and speaker 114.

Figure 2:
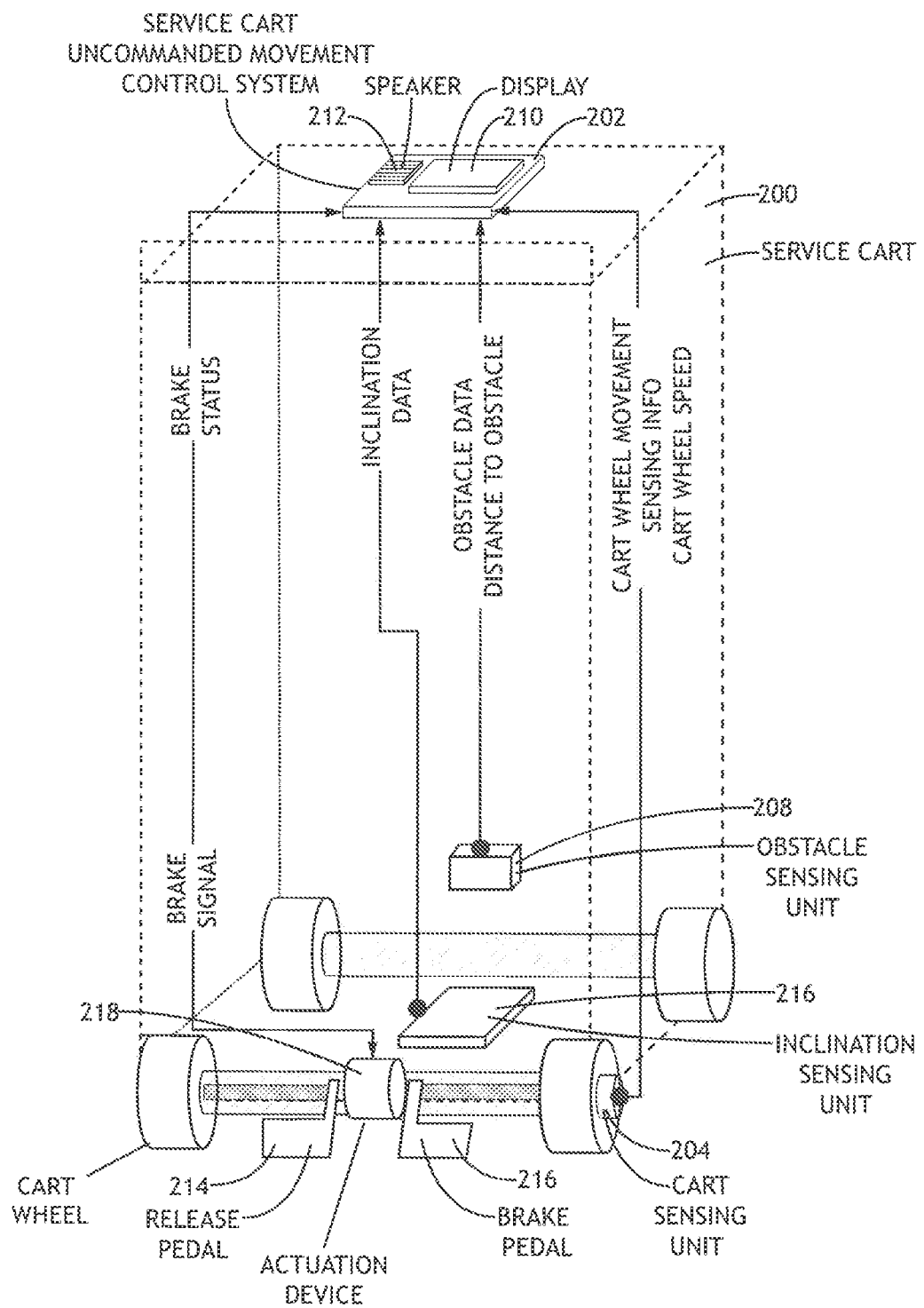
FIG. 2 shows a perspective view of an aircraft service cart according to an exemplary embodiment.

Referring to FIG. 2, a perspective view of an aircraft service cart 200 according to an exemplary embodiment is shown. The service cart 200 includes a controller 202 with a processor connected to one or more sensors 204, 206, 208. The processor may continuously display values from the sensors 204, 206, 208 on a connected display device 210 disposed on the controller 202 where a crew member can easily see it. In at least one embodiment, the controller 202 may include a speaker 212 for delivering audible warnings in the event a predefined sensor value limit is violated.

In at least one embodiment, the one or more sensors 204, 206, 208 include a speed senor 204. The speed sensor 204 may be disposed on a wheel of the service cart 200 to measure speed via a rotation sensor. Alternatively an optical sensor may register movement and translate such movement to a speed value.

In at least one embodiment, the one or more sensors 204, 206, 208 include one or more inclination sensors 206 disposed on a horizontal surface of the service cart 200. The inclination sensors 206 may measure a tilt value (such as cause by a change in inclination of the entire aircraft) likely to cause service cart 200 to roll. Alternatively, or in addition, the inclination sensors 206 may register a tilt of the service cart 200 with respect to the cabin floor. In at least one embodiment, values from the speed sensor 204 and inclination sensors 206 are monitored over time and/or in concert. For example, a high inclination value in conjunction with a small but increasing speed value may be associated with a relatively low speed threshold; by contrast, a small inclination value, or an inclination value in the opposite direction, in conjunction with a larger speed value may be associated with a larger speed threshold.

In at least one embodiment, the one or more sensors 204, 206, 208 include one or more obstacle proximity sensors 208. The one or more obstacle proximity sensors 208 may comprise ultrasonic sensors, laser sensors, optical sensors, etc. The one or more obstacle proximity sensors 208 identify any obstacles in front of the service cart 200 within a certain threshold.

In at least one embodiment, the controller 202 receives data from the one or more sensors 204, 206, 208, compares those data values to a database of predefined limits. The values may be displayed on the display device 210 along with any warnings when a predefined limit is reached. Alternatively, the controller 202 may only display warnings. In addition, the controller 202 may provide audible warnings via a speaker 212.

It may be appreciated that the predefined limits may be defined by functions relating sensor values; for example, the threshold of obstacle proximity identified by the obstacle proximity sensor 208 may change based on the speed of the service cart 200 as measured by the speed sensor 204.

In at least one embodiment, when a predefined limit is reached, the controller 202 may actuate an actuation device 218 to engage the service cart brakes. The controller 202 may then monitor the service cart release pedal 214 and only release the actuation device 218 when the release pedal is depressed.

The controller 202 may include a service cart brake pedal sensor to identify the state of the service cart brake pedal 216. If the controller 202 determines that the brake pedal 216 is already being depressed, the controller 202 may refrain from activating the actuation device 218.

Figure 3:
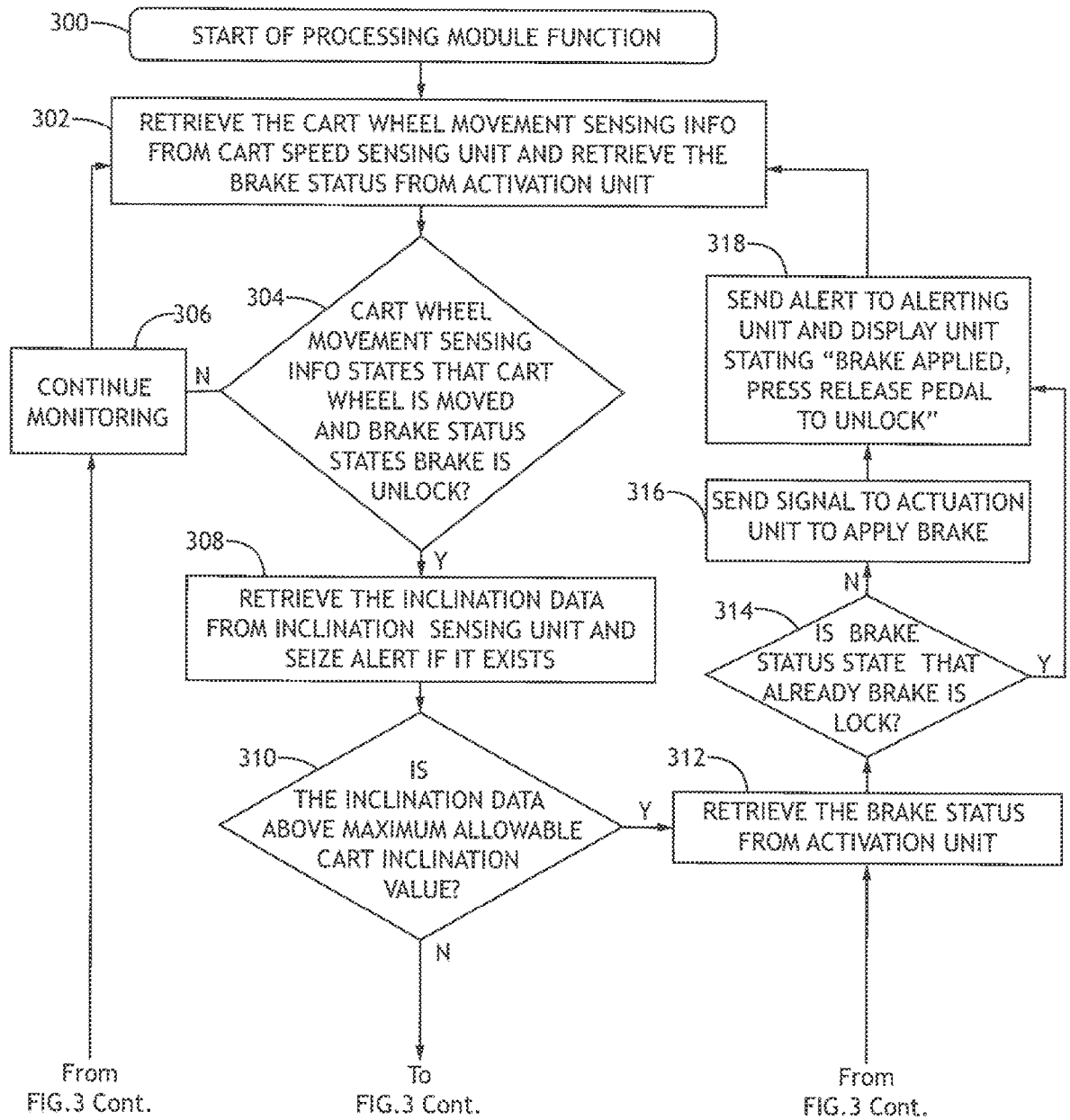
FIG. 3 shows a flowchart of a method for monitoring and controlling an uncommanded aircraft service cart.
Figure 3:
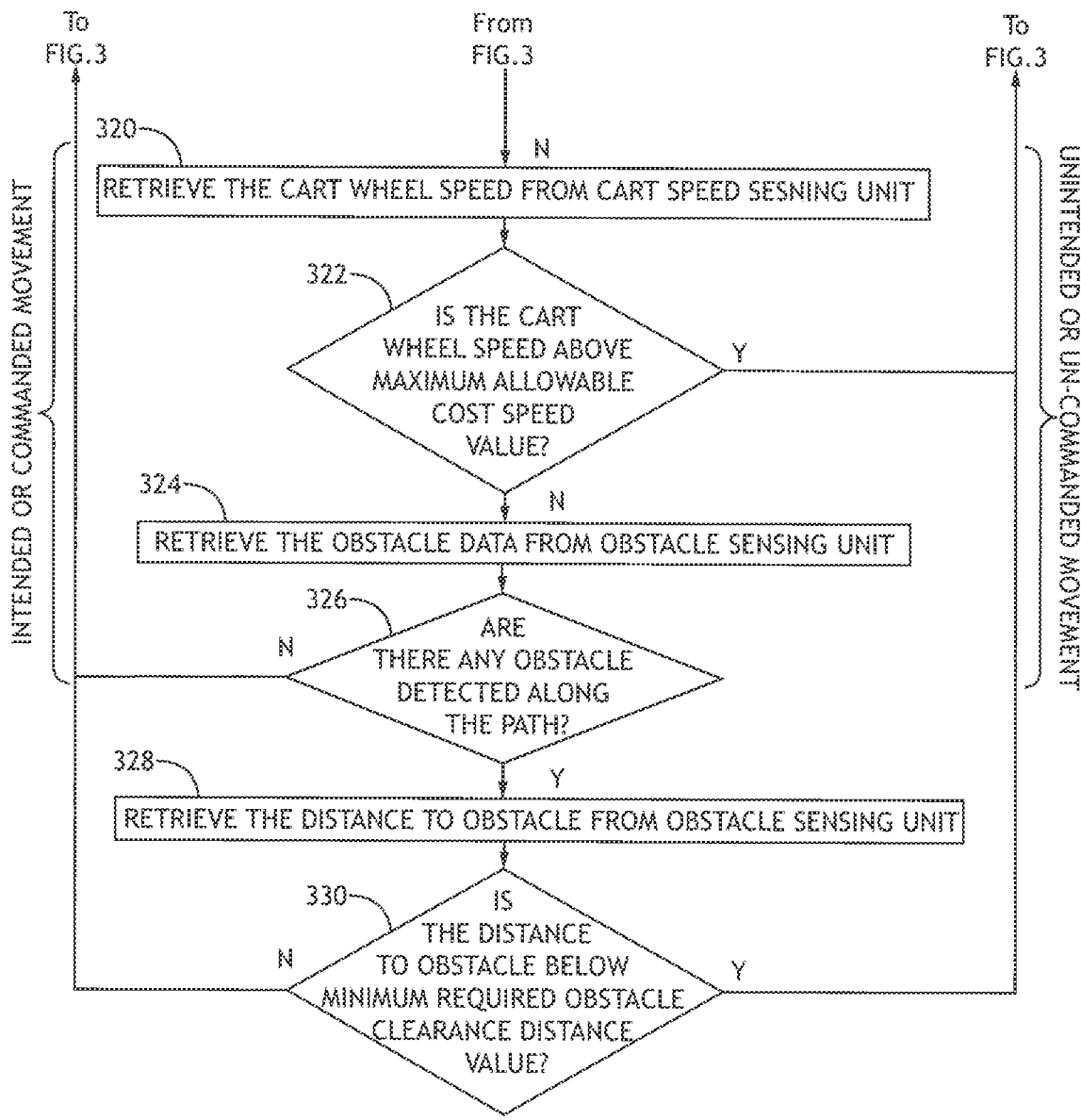

Referring to FIG. 3, a flowchart of a method for monitoring and controlling an uncommanded aircraft service cart is shown. When a service cart is deployed, a processor may startup 300 and continuously retrieve 302 wheel-speed sensor data and brake sensor data. When the processor determines 304 the wheel-speed sensor data does not indicate the wheels are moving or the brake is locked, the processor continues to monitor 306.

While the processor determines 304 the wheels are moving and the brake is unlocked, the processor continuously retrieves 308 inclination data from an inclination sensor. If the processor determines 310 the inclination data exceeds a maximum allowable value (predefined or defined by a function relating various sensor values, for example in relation to wheel-speed sensor data), the processor retrieves 312 brake status data from an actuation unit. If the processor determines 314 that the brake is already locked, the processor displays 318 an alert that the brake is applied; otherwise, the processor activates 316 the brake via the actuation unit and then displays 318 the alert.

If the processor determines 310 the inclination data does not exceed a maximum value, the processor retrieves 320 wheel-speed sensor data and determines 322 if the wheel-speed sensor data exceeds a maximum allowable value. If the processor determines 322 the wheel-speed data exceeds a maximum allowable value (predefined or defined by a function relating various sensor values), the processor retrieves 312 brake status data from an actuation unit. If the processor determines 314 that the brake is already locked, the processor displays 318 an alert that the brake is applied; otherwise, the processor activates 316 the brake via the actuation unit and then displays 318 the alert.

If the processor determines 322 the wheel-speed sensor data does not exceed a maximum allowable value, the processor retrieves 324 obstacle data from an obstacle proximity sensor. If the processor determines 326 there is no obstacle, the processor continues to monitor 306. If the processor determines 326 there is at least one obstacle, the processor may further retrieve 328 a distance value to the at least one obstacle. If the processor determines 330 the distance is less than a minimum value (predefined or defined by a function relating various sensor values), the processor retrieves 312 brake status data from an actuation unit. If the processor determines 314 that the brake is already locked, the processor displays 318 an alert that the brake is applied; otherwise, the processor activates 316 the brake via the actuation unit and then displays 318 the alert.

If the processor determines 330 the distance is greater than the minimum value, the processor continues monitoring 306.

Figure 4:
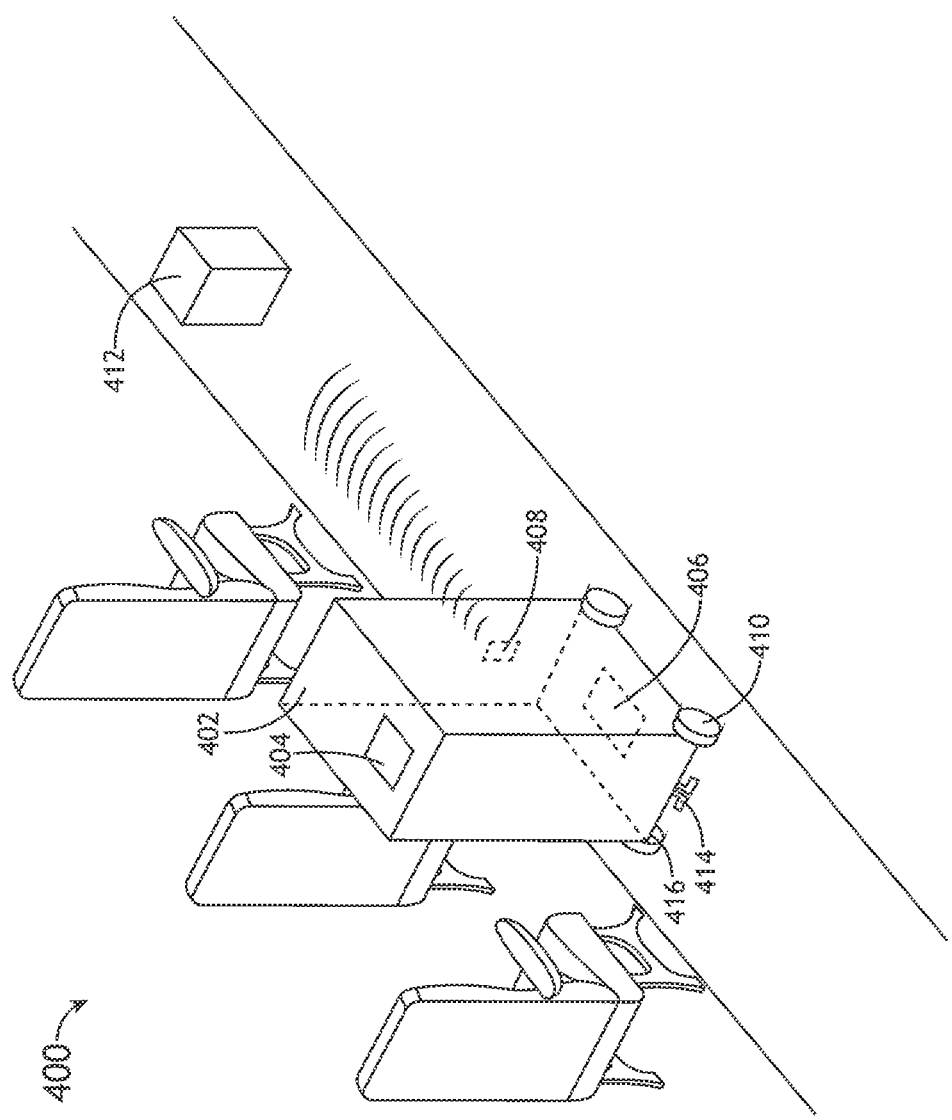
FIG. 4 shows a perspective environmental view of an aircraft service cart according to an exemplary embodiment.

Referring to FIG. 4, a perspective environmental view of an aircraft service cart 402 according to an exemplary embodiment is shown. In an aircraft cabin 400, the service cart 402 includes a crew interface device 404 having a display disposed on a top surface for displaying warnings and accepting crew member inputs. The crew interface device 404 is in data communication with a processor. The processor is also in data communication with an inclination sensor 406, an obstacle sensor 408, and a speed sensor 410.

The processor continuously receives values from the inclination sensor 406, obstacle sensor 408, and speed sensor 410, and compares the values to a set of value limits, either predefined or defined by sets of functions relating sensor values to each other and/or to a status of the service cart 402 set by a crew member; for example, a crew member may set the current state of the service cart 402 as "stowed," in which case the maximum allowable speed may be zero.

When the processor determines that sets of sensor values are beyond a defined limit, a brake actuator 416 activates the service cart brakes and warning message is displayed. A crew member may then need to press a release pedal 414. When the processor determines the release pedal has been depressed, the brake actuator 416 is released.

In at least one embodiment, the value limits may be based on rates of change; for example, the processor may display a warning message based on a constant speed and an obstacle 412 at a certain distance, but activate brake actuator 416 at the same obstacle distance, but an accelerating service cart 402.

Early detection of uncommanded movement of a service cart and automatically applying brakes can prevent damage to the aircraft and injury to cabin crew and passengers, even when the service cart is stowed. It may be appreciated that such systems and methods may be applied to non-aerospace industries such as automotive, shopping carts, etc.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   a speed sensor;
   an inclination sensor;
   at least one brake actuator; and
   at least one processor in data communication with both a proximity sensor and a memory storing processor executable code for configuring the at least one processor to:
      continuously receive inclination data from the inclination sensor and speed data from the speed sensor;
      continuously compare the speed data to a speed data limit in a database of limits and the inclination data to an inclination data limit in the database of limits;
      continuously receive obstacle data from the proximity sensor;
      continuously compare the obstacle data to a distance limit in a database of limits;
      actuate the brake actuator when the speed data exceeds the speed data limit or the inclination data exceeds the inclination data limit, or the obstacle data exceeds the distance limit.

2. The computer apparatus of claim 1, wherein the at least one processor is further configured to actuate the brake actuator when a function receiving the speed data and inclination data produces a combined value that exceeds a limit defined in the database of limits corresponding to an increasing speed value in a direction of inclination.

3. The computer apparatus of claim 1, wherein the at least one processor is further configured to actuate the brake actuator when a function receiving the speed data and obstacle data produces a combined value that exceeds a limit defined in the database of limits.

4. The computer apparatus of claim 1, further comprising a display in data communication with the at least one processor, wherein the at least one processor is further configured to display a warning whenever the brake actuator is engaged.

5. The computer apparatus of claim 1, further comprising a brake sensor in data communication with the at least one processor, wherein:
   the at least one processor is further configured to continuously receive brake sensor data; and
   actuating the brake actuator further includes determining that the brake sensor data indicates a brake is not engaged.

6. The computer apparatus of claim 1, wherein the at least one processor is further configured to:
   determine that the speed sensor data indicates no movement for a predefined period of time; and
   place the brake actuator in a stowed configuration.

7. An aircraft service cart comprising:
   a computer apparatus comprising:
      a speed sensor configured to receive speed data corresponding to wheels on the service cart;
      an inclination sensor disposed on a horizontal surface of the service cart;
      at least one brake actuator configured to actuate a service cart brake; and
      at least one processor in data communication with both a proximity sensor and a memory storing processor executable code for configuring the at least one processor to:
         continuously receive inclination data from the inclination sensor and speed data from the speed sensor;
         continuously compare the speed data to a speed data limit in a database of limits and the inclination data to an inclination data limit in the database of limits;
         continuously receive obstacle data from the proximity sensor;

continuously compare the obstacle data to a distance limit in a database of limits; and actuate the brake actuator when the speed data exceeds the speed data limit or the inclination data exceeds the inclination data limit, or the obstacle data exceeds the distance limit.

8. The aircraft service cart of claim 7, wherein the at least one processor is further configured to actuate the brake actuator when a function receiving the speed data and inclination data produces a combined value that exceeds a limit defined in the database of limits corresponding to an increasing speed value in a direction of inclination.

9. The aircraft service cart of claim 7, wherein the at least one processor is further configured to actuate the brake actuator when a function receiving the speed data and obstacle data produces a combined value that exceeds a limit defined in the database of limits.

10. The aircraft service cart of claim 7, further comprising a display in data communication with the at least one processor, wherein the at least one processor is further configured to display a warning whenever the brake actuator is engaged.

11. The aircraft service cart of claim 10 further comprising a speaker in data communication with the at least one processor, wherein the at least one processor is further configured to play an audible warning whenever the brake actuator is engaged.

12. The aircraft service cart of claim 7, further comprising a brake sensor in data communication with the at least one processor, wherein:

the at least one processor is further configured to continuously receive brake sensor data; and actuating the brake actuator further includes determining that the brake sensor data indicates the service cart brake is not engaged.

13. The aircraft service cart of claim 7, wherein the at least one processor is further configured to:

determine that the speed sensor data indicates no movement for a predefined period of time; and place the brake actuator in a stowed configuration.

* * * * *

UNITED STATES PATENT AND TRADEMARK OFFICE
CERTIFICATE OF CORRECTION

| | | |
|---|---|---|
| PATENT NO. | : 11,535,379 B1 | Page 1 of 1 |
| APPLICATION NO. | : 16/790187 | |
| DATED | : December 27, 2022 | |
| INVENTOR(S) | : Ganeshraj Rajan and Divakara Rao Vadada | |

It is certified that error appears in the above-identified patent and that said Letters Patent is hereby corrected as shown below:

On the Title Page

Item (72) Inventors:
"(72) Inventors: Ganeshraj Rajan, Tamil Nadu, (IN)
              Divakararao Vadada, Bangalore, (IN)"

SHOULD READ:
-- (72) Inventors: Ganeshraj Rajan, Tamil Nadu, (IN)
              Divakara Rao Vadada, Bangalore, (IN) --

Signed and Sealed this
Fourteenth Day of March, 2023

Katherine Kelly Vidal
*Director of the United States Patent and Trademark Office*